(No Model.)
W. P. MERRY.
HEAT EQUALIZER.
No. 347,819. Patented Aug. 24, 1886.
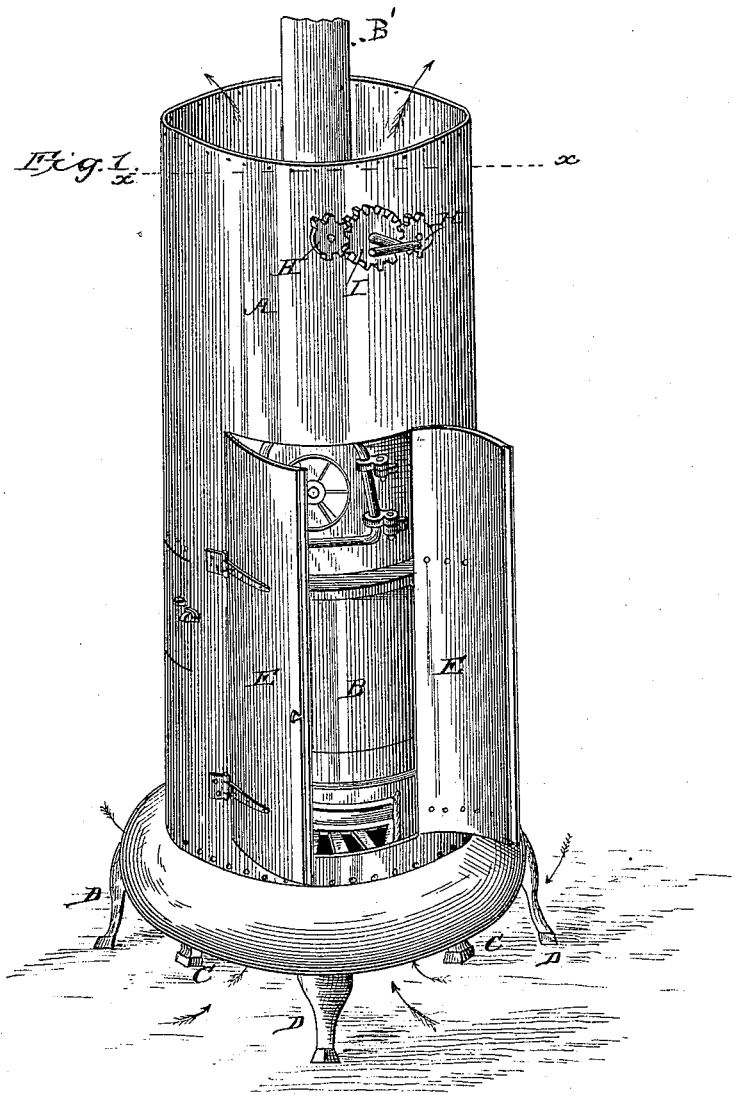
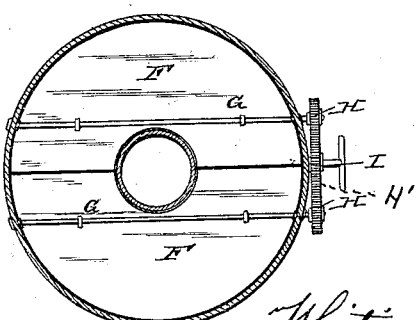
WITNESSES:
Fred. G. Dieterich.
Jos. D. Ryan
INVENTOR.
Whiting P. Merry
By Daniel Breed ATTORNEY.
N. PETERS, Photo-Lithographer, Washington, D. C.

UNITED STATES PATENT OFFICE.

WHITING P. MERRY, OF CORTLAND, OHIO.

HEAT-EQUALIZER.

SPECIFICATION forming part of Letters Patent No. 347,819, dated August 24, 1886.

Application filed August 1, 1885. Serial No. 173,267. (No model.)

*To all whom it may concern:*

Be it known that I, WHITING P. MERRY, a citizen of the United States, residing at Cortland, in the county of Trumbull and State of Ohio, have invented certain new and useful Improvements in Heat-Equalizers; and I do hereby declare that the following is a full, clear, and exact description of the invention, which will enable others skilled in the art to which it appertains to make and use the same.

My invention consists of a casing around a heating-stove, the same being open at the top and the bottom, the top being provided with two opposite acting dampers, whereby when the dampers are open a current of cold air will pass under the bottom of the casing upward, between the casing and stove, become heated, and pass out of the top in a continuous flow, thereby distributing the heat throughout the room and equalizing the temperature.

In the accompanying drawings, Figure 1 is a side elevation of my improved casing surrounding a stove. Fig. 2 is a transverse section of the same near top, showing pivoted dampers and gear-connections.

In the drawings, A represents the casing or heat-equalizer, and B a common form of heating-stove. The stove is supported on legs C, in the usual manner, and the casing has its own separate legs D. It is necessary to provide the casing A with doors to give access to the coal or fuel door and ash-pit, and also to allow the warming of feet. For these purposes a single set of doors, E, may be employed, or several separate doors, as desired.

Near the top of the casing A, on the inside, are pivoted two half-circular dampers, F. Said dampers are rigidly secured to pivot-rods G, the ends of which pass loosely through the casing A, and the out ends on one side are provided with pinion-wheels H. Gearing with and between wheels H is pivoted a toothed drive-wheel, H', which is provided with a projecting hand-piece, I. The center of dampers F is formed with central annular recesses adapted to receive and fit tightly around pipe B' when closed. When desired to open dampers F, hand-piece I is turned to the right, when gear-wheel H' moves gear-wheels H, thus opening dampers F, and by turning said hand-piece I to the left closing them.

It will be seen that any degree of space between dampers and casing may be used to control the flow of hot air into the room, and by this construction the dampers will remain where stopped, and will not move unless operated by the hand-piece I.

My equalizer may be made of size and form to fit different stoves.

Having thus described my invention, what I claim, and desire to secure by Letters Patent of the United States, is—

A heat distributer and equalizer consisting of a heating-stove, an independent casing surrounding said stove, a pair of dampers pivoted within the casing above the stove, and a shaft in said casing between the damper-shafts, whereby said dampers may be simultaneously operated, substantially as shown and set forth.

In testimony that I claim the above invention I have hereunto subscribed my name in the presence of two witnesses.

WHITING P. MERRY.

Witnesses:
 HATTIE HILLOCK,
 THOMAS HILLOCK.